No. 687,218. Patented Nov. 26, 1901.
A. A. GABRIEL & E. M. ATKINSON.
PARCEL CARRIER FOR BICYCLES.
(Application filed Nov. 21, 1900.)
(No Model.)
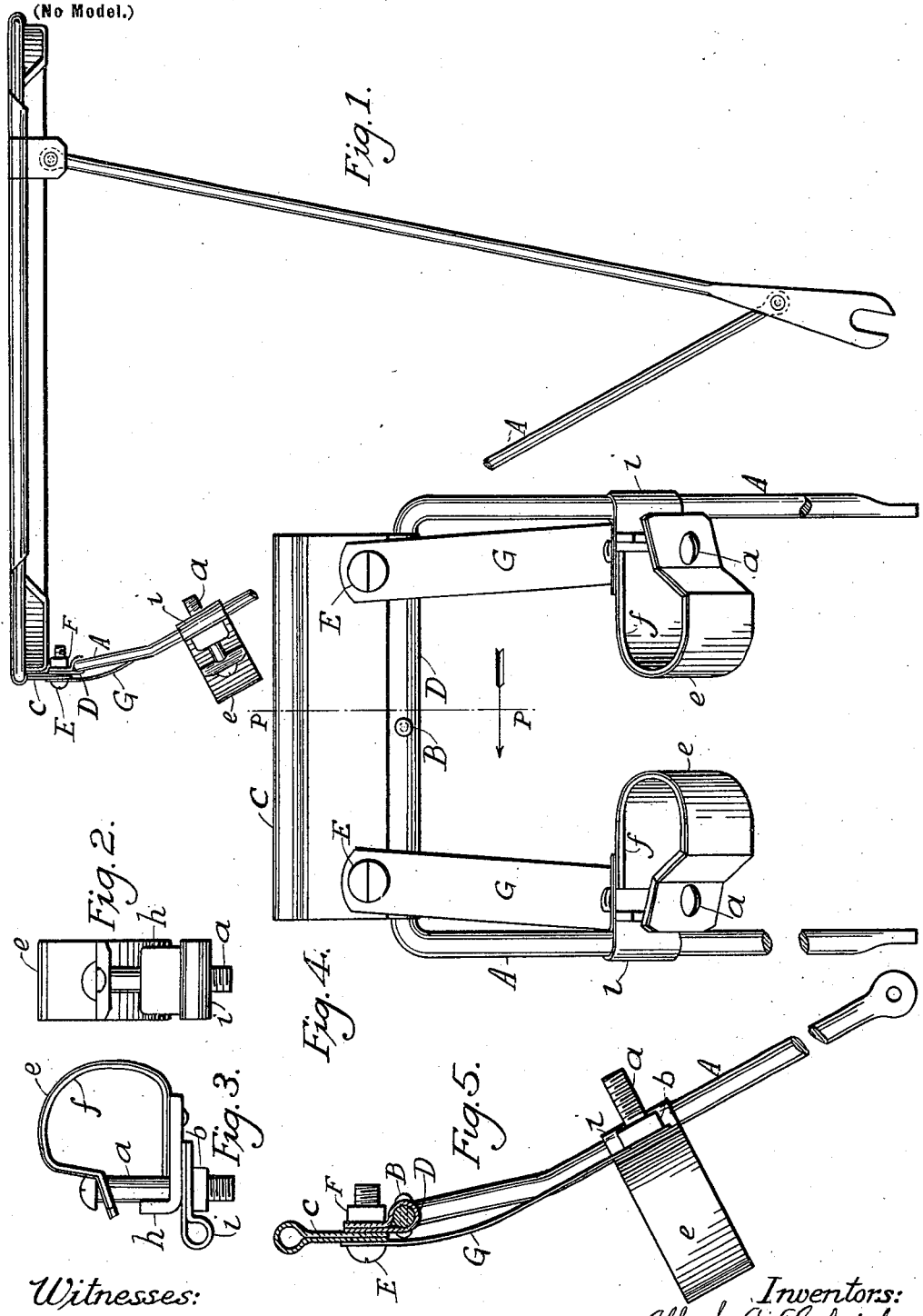

United States Patent Office.

ALBERT A. GABRIEL AND EDWARD M. ATKINSON, OF PORTLAND, OREGON.

PARCEL-CARRIER FOR BICYCLES.

SPECIFICATION forming part of Letters Patent No. 687,218, dated November 26, 1901.

Application filed November 21, 1900. Serial No. 37,306. (No model.)

*To all whom it may concern:*

Be it known that we, ALBERT A. GABRIEL and EDWARD M. ATKINSON, citizens of the United States, residing at Portland, in the county of Multnomah and State of Oregon, have invented a new and useful Parcel-Carrier for Bicycles, which is an improvement on the invention described in Letters Patent No. 643,373, dated February 13, 1900, issued to us.

The objects of our invention are to make a rigid parcel-carrier for bicycles and to attach the same rigidly to the frames thereof at either end without defacing the wheel and to fold it compactly for shipment and to place loads upon bicycles so as to cause the slightest vibration of the frames. It is light and durable, and being of few parts and simple construction it is not costly to make.

Figure 1 is a side view of the carrier. Fig. 2 is an end view of the band and lug shown similarly in Fig. 1. Fig. 3 is a side view of the band and lug. Fig. 4 is a rear view of the carrier, showing all the parts of the invention. Fig. 5 is a sectional view of the carrier at the dotted line P P in Fig. 4.

The invention consists of two standards A in a continuous piece riveted to the standards near their base, which sustain the front part of the carrier, as named in said Letters Patent. The top of A is encircled with a lug D, secured by a rivet B.

C is a lug encircling the wire in the rim of the carrier and is securely fastened to D by two bolts E E.

F shows the nut locked on the bolt E.

G G are stays connecting the bands $e$ $e$ with the lugs D and C by means of bolts $a$ $a$ and E E.

$b$ $b$ are nuts locked on bolts $a$ $a$.

$e$ is a metal band to encircle forks on stays of a bicycle.

$f$ is a soft lining of $e$, preferably of leather.

$h$ is a piece of heavier metal riveted to $e$ and bent at a right angle to the bolt $a$.

$i$ is a smaller lug encircling standards A and secured to band $e$ by bolt $a$. The band $e$ has lugs at each end. One lug is formed with an eyelet brought through the hole and serves as a means of fastening one end of the soft lining. The other lug is formed of a heavy piece of metal $h$, riveted to $e$, and this rivet serves as a means of fastening the other end of the soft lining. The last-named lug is bent at a right angle on the bolt $a$ for the purpose of drawing the bolt at a right angle to itself, thus securing a flat bearing for the lug $i$.

The standards A are tipped far enough back to clear the head of the bicycle-forks. The locking of nuts F and $b$ $b$ is done by crowding the square side of same against the thickness of wire in either of the standards or rim of the carrier.

We claim and desire to secure by Letters Patent—

1. In a parcel-carrier for bicycles, the combination with the seat portion of the same, of supporting-legs extending from one side of the same and adapted to embrace the axle of the bicycle, rods connecting said legs with the other side of the seat, means for detachably securing the rods to the seat, clamps for securing said rods to the fork of the bicycle, and stays connecting the clamps and seat.

2. In a parcel-carrier for bicycles, the combination with the seat portion of the same, of legs extending from one side of said seat and adapted to embrace the axle of the bicycle, rods connecting the other side of the seat portion with said legs, a leaf extending from the seat, a leaf connected to the upper end of the rods for detachably securing the rods to the seat, leaf-clamps to secure the rods to the bicycle-fork, and stays connecting the clamps to the seat.

A. A. GABRIEL.
E. M. ATKINSON.

Witnesses:
CHAS. SCHMIDT,
J. R. ROGERS.